A. B. CORNELIUS & D. C. DEAN.
NUT LOCK.
APPLICATION FILED MAR. 27, 1909.
971,023.
Patented Sept. 27, 1910.
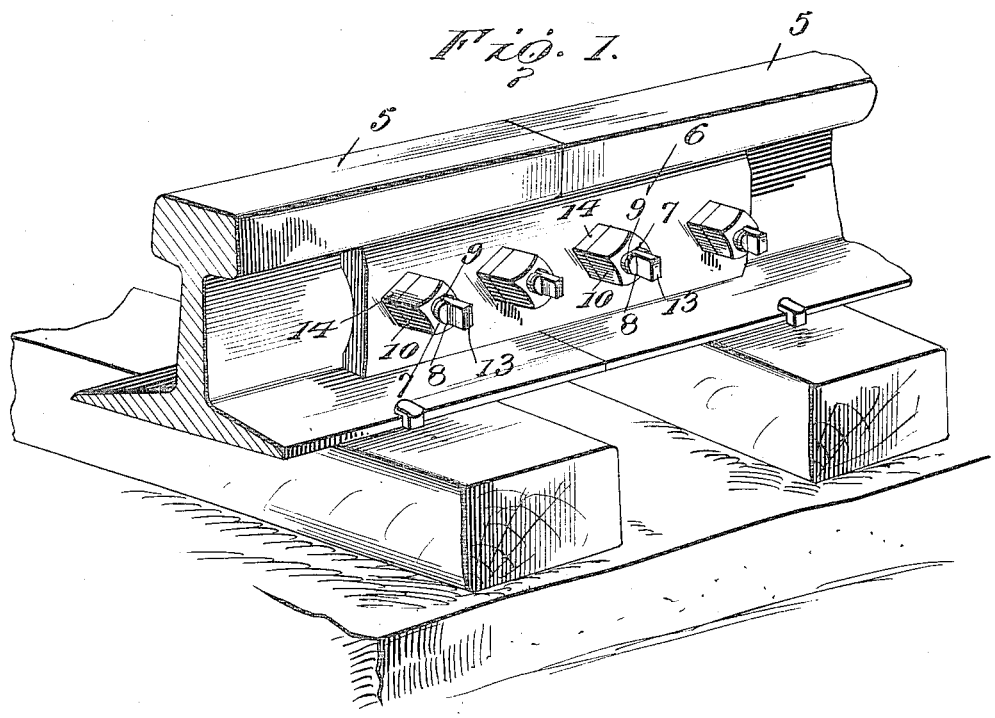
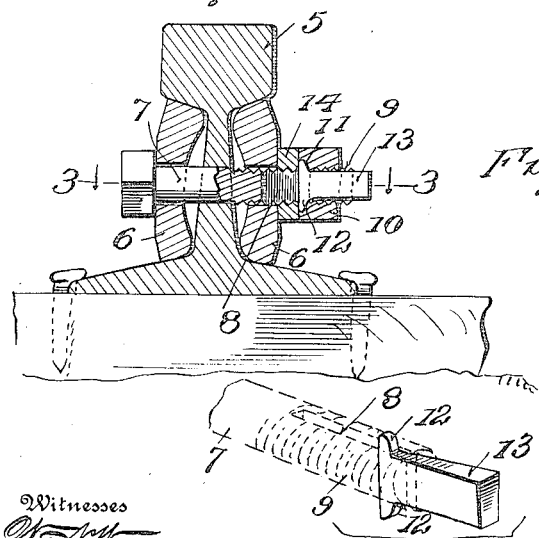
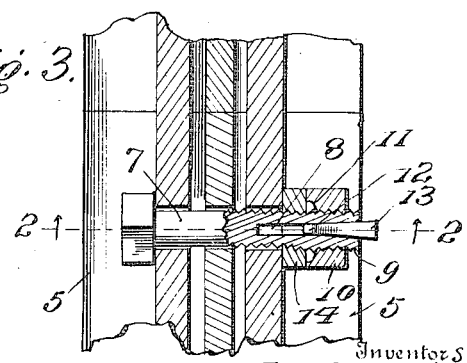
Witnesses
Inventors
A. B. Cornelius
Daniel C. Dean
By
Attorneys.

UNITED STATES PATENT OFFICE.

ARTHUR B. CORNELIUS AND DANIEL C. DEAN, OF ALTON PARK, TENNESSEE.

NUT-LOCK.

971,023.  Specification of Letters Patent.  Patented Sept. 27, 1910.

Application filed March 27, 1909. Serial No. 486,155.

*To all whom it may concern:*

Be it known that we, ARTHUR B. CORNELIUS and DANIEL CLYDE DEAN, citizens of the United States, residing at Alton Park, in the county of Hamilton and State of Tennessee, have invented certain new and useful Improvements in Nut-Locks, of which the following is a specification.

This invention relates to nut locks and has for its object to provide a comparatively simple and inexpensive device of this character for preventing turning movement of the nuts on railway track bolts incident to the passage of trains and other railway rolling stock.

A further object of the invention is to provide a nut lock including a wedge shaped key adapted to enter an opening in the bolt and expand the walls of the latter when the nut is adjusted on said bolt, thereby to prevent accidental turning movement of the nut.

A further object is to provide an auxiliary nut or washer arranged to co-act with the main nut for releasing the wedge or key when it is desired, for any reason, to remove the securing bolt.

A still further object of the invention is generally to improve this class of devices so as to increase their utility, durability, and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a nut lock constructed in accordance with my invention, showing the same applied to the mating ends of adjacent track sections; Fig. 2 is a vertical sectional view; Fig. 3 is a horizontal sectional view; Fig. 4 is a detail perspective view of the bifurcated end of the bolt showing the manner of positioning the wedge shaped locking key therein.

Corresponding and like parts are referred to in the following description and indicated in all the views of the drawings by the same reference characters.

The improved nut lock forming the subject matter of the present invention is principally designed for use in connection with that class of bolts employed for securing the abutting ends of adjacent rail sections in assembled position, and by way of illustration is shown applied to a section track, in which 5 designates one of the rails, 6 the fish plates, and 7 the securing bolt extending through the fish plates and the web of the rail in the usual manner. One end of the bolt is split longitudinally at 8 to form co-acting spring sections 9, the exterior walls of which are threaded for engagement with the interiorly threaded walls of the main nut 10. The rear face of the nut 10 is provided with a tapered seat 11 which entirely surrounds the bolt receiving opening and serves to accommodate laterally extending lips 12 of a wedge shaped locking key or member 13. The key 13 is adapted to enter the slot 8 in the bolt with the lips 12 of said key engaging the rear face of the nut at the recess 11 so that when the nut 10 is positioned on the bolt and adjusted longitudinally of the latter, the wedge will be forced longitudinally within the slot 8 and expand the threaded walls of the sections 9, thereby to firmly clamp the nut on the bolt and prevent accidental turning movement of the same incident to the passage of trains and other railway rolling stock.

Interposed between the rear face of the nut 10 and the adjacent fish plate 6, is an auxiliary nut 14 the side walls of which are disposed flush with and form a continuation of the side walls of the nut 10, said nut 14 having oppositely disposed flat bearing surfaces, one of which forms a housing for the lips 12 of the locking key or wedge, while the other bears against the fish plate and said nut 14 serves to prevent the reduced end of the wedge from coming into contact with any rough or irregular surface on the fish plate or other support. The auxiliary nut 14 not only serves to house and protect the lips 12 of the wedge shaped locking key, but also serves to release said locking key from the opening 8 in the bolt when, for any reason, it is desired to remove the bolt, this result being accomplished by engaging both nuts with a wrench or other suitable tool, and simultaneously rotating both nuts in the same direction.

It will here be noted that when the nuts 10 and 14 are rotated, the outer flat bearing surface of the auxiliary nut 14, will press laterally against the lips 12 of the locking key or member 13 so that each rotation of the auxiliary nut will tend to force the large end of the wedge shaped key out of the slot 8, thereby to allow contraction of the sections 9 and thus permit ready removal o the nut 10. It will also be noted that the member 14 forms in effect a jam nut to assist in holding the main nut in position on the threaded end of the bolt.

In the use of the device, the auxiliary nut 14 is first threaded on the bolt 7, after which the wedge shaped key 13 is introduced within the slot 8 and the main nut 10 adjusted on said nut 14 in the usual manner. As the nut 10 is rotated the lips 12 will be forced longitudinally of the bolt and consequently draw the large end of the wedge within the slot, thereby to expand the sections 9 of the bolt and prevent rearward turning movement of the nut in the manner before stated.

It will of course be understood that the bolt may be provided with a plurality of intersecting slots, and in which event the locking wedge or key will be provided with a corresponding number of laterally extending lips.

While the device is principally designed for use in connection with railway track bolts, it is obvious that the same may be used with equally good results on bolts for steam engines, bridges, scaffolds, or wherever a device of this character is found desirable.

Having thus described the invention, what is claimed as new is:

1. The combination with a support, of a longitudinally split bolt extending through the support, a main nut threaded on the split end of the bolt and having its inner face provided with a seating recess, a wedge shaped locking key seated in the split portion of the bolt and having its large end imperforate and projecting beyond the outer face of the nut and its small end provided with oppositely disposed lips adapted to bear against the walls of the seating recess in the nut, and an auxiliary nut bearing against the support and inner face of the main nut respectively, said auxiliary nut when rotated simultaneously with the main nut serving to effect the release of the locking key.

2. The combination with a support, of a longitudinally split bolt extending through the support, a main nut threaded on the split end of the bolt and having an inner flat bearing face provided with a seating recess surrounding the bolt receiving opening, an imperforate wedge-shaped locking key seated in the split portion of the bolt and having its large end projecting beyond the outer face of the nut and its small end provided with oppositely disposed laterally extending lips arranged to enter the seating recess in the main nut, and an auxiliary nut having its side walls disposed flush with the side walls of the main nut and provided with oppositely disposed flat bearing surfaces, one of which engages the support and the other the inner flat bearing face of the main nut to form with said recess a housing for the lips of the locking member, said auxiliary nut when rotated simultaneously with the main nut serving to effect the release of the locking member.

3. The combination with a longitudinally split bolt, of a nut threaded on the split end of the bolt and having its rear face provided with a conical shaped recess surrounding the bolt receiving opening, an imperforate wedge shaped locking member seated in the slotted portion of the bolt and having its large end projecting beyond the outer face of the nut and its small end provided with oppositely disposed laterally extending lips having inclined bearing faces for engagement with the walls of the recess in the nut, and an auxiliary nut having its side walls disposed flush with the side walls of the main nut and provided with oppositely disposed flat bearing surfaces, one of which is adapted to bear against the recessed face of the main nut and form with said recess a housing for the laterally extending lips of the locking key, said auxiliary nut when rotated simultaneously with the main nut serving to effect the release of the locking member.

In testimony whereof we affix our signatures in presence of two witnesses.

ARTHUR B. CORNELIUS. [L. S.]
DANIEL C. DEAN. [L. S.]

Witnesses:
D. E. DRIPS,
W. H. MEACHUM.